(12) United States Patent
Menegoli et al.

(10) Patent No.: US 8,907,644 B2
(45) Date of Patent: Dec. 9, 2014

(54) SYNCHRONIZATION OF HYSTERETIC POWER CONVERTERS

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 776 days.

(21) Appl. No.: 13/135,701

(22) Filed: Jul. 14, 2011

(65) Prior Publication Data

US 2013/0015829 A1    Jan. 17, 2013

(51) Int. Cl.
*H02M 1/00* (2006.01)
*H02M 3/158* (2006.01)
*H02M 3/156* (2006.01)

(52) U.S. Cl.
CPC ............ *H02M 3/158* (2013.01); *H02M 3/1563* (2013.01); *H02M 2001/0025* (2013.01)
USPC .......................................... 323/282; 323/271

(58) Field of Classification Search
USPC .................................. 323/222, 282–288, 271
See application file for complete search history.

(56) References Cited

U.S. PATENT DOCUMENTS

| | | | | |
|---|---|---|---|---|
| 5,770,940 A * | 6/1998 | Goder | | 323/282 |
| 6,894,471 B2 * | 5/2005 | Corva et al. | | 323/282 |
| 6,979,985 B2 * | 12/2005 | Yoshida et al. | | 323/282 |
| 7,279,875 B2 * | 10/2007 | Gan et al. | | 323/282 |
| 7,315,153 B2 * | 1/2008 | Tazawa et al. | | 323/284 |
| 7,443,148 B2 * | 10/2008 | Weng | | 323/271 |
| 7,482,791 B2 * | 1/2009 | Stoichita et al. | | 323/271 |
| 7,626,370 B1 * | 12/2009 | Mei et al. | | 323/282 |
| 8,085,011 B1 * | 12/2011 | Petricek | | 323/259 |
| 2005/0156582 A1 * | 7/2005 | Redl et al. | | 323/282 |
| 2007/0222395 A1 * | 9/2007 | Chen et al. | | 315/224 |
| 2008/0042633 A1 * | 2/2008 | Klein | | 323/288 |
| 2010/0308660 A1 * | 12/2010 | Willis | | 307/77 |

OTHER PUBLICATIONS

Gerhard Schrom et al., A 480-MHz Multi-Phase Interleaved Buck DC-DC Converter with Hysteretic Control, IEEE Power Electronics, 2004, p. 4702-4707, Germany.
Kiichiro Taniguchi et al.,Constant Frequency Hysteretic PWM Controlled Buck Converter, PEDS, 2009, p. 1194-1199, Oita, Japan.

* cited by examiner

*Primary Examiner* — Jue Zhang

(57) ABSTRACT

A novel method to synchronize the switching frequency of hysteretic power converters is presented. The method includes the generation of a clock signal and the injection of a periodic disturbance signal operating at the frequency of the generated clock in the main loop of the converter to synchronize the hysteretic power converter to switch at the frequency of the clock.
The presented approach provides significant advantages with respect to the more traditional means of utilizing Frequency Lock Loop, Phase Lock Loop or Delay Lock Loop circuits, mainly for its simplicity, faster locking and much reduced phase error.
The switching frequency can be higher or lower than the free running frequency of the power converter provided that the free running frequency is close enough to the desired switching frequency.
The method is presented for buck and boost hysteretic high frequency switching power converters.

22 Claims, 10 Drawing Sheets

SYNCHRONIZATION OF HYSTERETIC POWER CONVERTERS

BACKGROUND OF THE INVENTION

1. Field of the Invention

The present invention is in the field of power converters. The present invention is further in the field of semiconductor switching power converters. The present invention further relates to the field of integrated hysteretic control methods for switching power converters and circuits. The present invention is further in the field of integrated switching power converters. The present invention is further in the field of frequency synchronization methods for hysteretic switching power converters. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general, power switching converters are becoming more and more important for their compact size, cost and efficiency. Switching power converters comprise isolated and non isolated topologies. The galvanic isolation is generally provided by the utilization of transformers. Although the subject invention is mainly focused on non isolated switching power converters, it refers both to isolated and non isolated power converters.

Modern switching power converters are in general divided in step down power converters, also commonly known as "buck converters", and step up power converters commonly known as "boost converters". This definition stems from the ability of the converter to generate regulated output voltages that are lower or higher than the input voltage regardless of the load applied.

One class of modern switching power converters implemented in integrated circuits is the one comprising hysteretic control or pseudo-hysteretic control where a synthetic ripple signal is generated in a feedback network and compared to a reference to determine the duty cycle of the switching period to regulate the output voltage at the desired level. These hysteretic power converters do not include an error amplifier, a specific compensation network or a periodic signal to determine the switching frequency.

In fact their switching frequency is determined by several factors like the input voltage, the output voltage, the load, the output capacitor value, the inductor value, the hysteresis value, and the general propagation delays of the feedback network, of the comparator, of the driver, and of the output stage. Therefore, if left uncontrolled, the switching frequency of these power converters varies depending on the conditions of the converter.

However typically it is desirable to have constant switching frequency in continuous conduction mode for several reasons, but mainly to contain the harmonic content of the switching and eventually to allow the filtering of electromagnetic interference generated by the fast slew rate of the output nodes of the converter.

Although the imposition of a constant switching frequency somewhat alters the frequency response of the power converters and complicates the analysis and study of the stability of the regulator in presence of line and load transients, the switching frequency is generally regulated and maintained constant by means of Phase Lock Loop (PLL), Frequency Lock Loop (FLL) or Delay Lock Loop (DLL) circuits. These circuits effectively modulate a loop parameter to regulate the switching frequency to be the same as the frequency of a clock signal.

FIG. 1 depicts a typical prior art block diagram of a hysteretic buck converter with switching frequency control. The oscillator 5 generates a clock signal operating at the desired frequency. The PLL block 4 compares the clock signal with the drive signal coming from the comparator and generates a voltage proportional to the error signal. The output of the PLL 4 is fed into a hysteresis control block 3 that modulates the hysteresis of the comparator 2 in order to regulate the switching frequency of the power converter to be the same as the one of the clock signal generated by the oscillator 5.

These frequency control circuits are clearly operating in closed loop and as such need to be frequency compensated to be locking as quickly as possible and be stable in all conditions. These requirements are often not trivial and the common outcome is that a PLL circuit typically requires several clock cycles to lock to a desired frequency. Furthermore these circuits are often affected by noise and present jitter or phase noise of the switching. A typical PLL requires a phase detector, a filter and a VCO (Voltage Controlled Oscillator).

In hysteretic power converters one of the most challenging transitions occurs when the load is abruptly switched on from a condition of very light load. In this case the power converter should provide a relatively stable output voltage with minimum undershoot and a fast transition from DCM (Discontinuous Conduction Mode) to CCM (Continuous Conduction Mode) where the term Discontinuous or Continuous refers to the inductor current. When the load is very low the inductor current tends to reach the zero value within the switching period, while, when the load is significant, the inductor current remains positive during the whole period.

In order to maintain high efficiency throughout all the load conditions, in DCM, the power converter needs to lower its switching frequency and to reduce, as much as possible, the current consumption of the integrated circuit. This reduction of power consumption is obtained by turning off various portions of the circuit and by slowing down (lowering the bias) the sections of the power converter that are required to continue functioning. The power converter does not need to regulate its switching frequency in DCM and it operates in PFM (Pulse Frequency Modulation), therefore the frequency synchronization circuit is either turned off or significantly de-biased.

However when the transition to CCM is required, the frequency control circuit needs to turn on and possibly to lock to the desired frequency as quickly as possible in order to avoid uncontrolled switching and high magnitude EMI generation outside of the known spectrum.

In the field of oscillators, and in particular in the field of ring oscillators, it has been proposed the use of injection locking mechanisms to reduce significantly the phase noise of the oscillators. Injection locking phenomenon is based on the observation that two oscillatory systems can lock when they have close frequencies and environmental coupling. The frequency of the two oscillatory systems is the same at the lock conditions although their phase may be different.

A very particular implementation of this mechanism has been described in the paper presented at the 35$^{th}$ Annual IEEE Power Electronics Specialists Conference in 2004 by Gerhard Schrom and others "A 480-MHz, Multi-Phase Interleaved Buck DC-DC Converter with Hysteretic Control". In this paper the authors propose the injection of a synchronization signal at the reference used in a hysteretic buck power converter, and more specifically at the hysteresis generation node so that the switching instants can follow the envelope of the hysteresis band.

In other words, if the amplitude of the injected signal is adequate, the hysteresis levels can be altered to the point that the switching frequency of the power converter becomes the same as the one of the injected signal, provided that the switching frequency be lower than the free running frequency, defined as the frequency without any injected signal, and close enough in value.

Similarly, a paper by Kiichiro Taniguchi, Terukazu Sato, Takashi Nabeshim, and Kimihiro Nishijima "Constant Frequency Hysteretic PWM Controlled Buck Converter" published in 2009, describes a voltage mode buck power converter in which a current signal is injected between the feedback resistor and the input resistor that determine the hysteresis of a comparator. In this case the reference voltage is fed to an error amplifier whose output feeds the comparator.

However the cited prior art does not cover the general problem of synchronizing a hysteretic power converter to a desired frequency higher or lower than the free running frequency. In addition the amplitude of the injected signal is computed for certain values of Vin, but in present systems the input voltage may vary significantly. If the amplitude is not sufficiently large, the desired synchronization does not occur, while if it is too large a temporary undesired perturbation of the duty cycle may cause spikes or glitches in the output voltage.

Moreover if the desired frequency is not close enough to the free running frequency of the system, the switching frequency may lock to sub-harmonic frequencies with very unpleasant results. This phenomenon is also dependent on the amplitude of the disturbance signal injected.

It is therefore a purpose of the present invention to describe a novel method to synchronize hysteretic switching power converters in a manner that is reliable, simple, locking very quickly and with minimum jitter, while consuming little power. It is another purpose of the present invention to describe a method of synchronizing hysteretic switching power converters at frequencies either higher or lower than the free running frequency.

SUMMARY OF THE INVENTION

It is an objective of the present invention to provide a method for synchronizing hysteretic switching power converters in Continuous Conduction Mode (CCM) to operate at a desired frequency either higher or lower than their free running frequency by injecting a disturbance signal in specific nodes of the feedback network. The converter can be switched from DCM mode into CCM very quickly without affecting significantly the regulated output voltage.

It is another objective of the present invention to provide a methodology to synchronize in CCM reliably, and with minimum phase error both hysteretic buck power converters and hysteretic boost power converters offering a valid alternative to present Phase Lock Loop circuitries, while consuming low power thus contributing to the overall efficiency of the power converter.

It is another objective of the present invention to provide a circuit to regulate the amplitude of the disturbance signal so as to minimally affect the duty cycle of the converter during the transition. It is another objective of the present invention to adjust the free running frequency of the converter to be in the locking range of the novel synchronization method proposed.

The present invention describes a means to synchronize hysteretic power converters to a desired switching frequency in Continuous Conduction Mode without the use of Phase or Frequency Lock Loop circuits. The proposed circuit generates a periodic disturbance signal at the same frequency of the desired switching frequency with minimum duty cycle and it injects it in a specific node of the feedback network of the hysteretic converter.

The feedback network is generally constituted of passive components to generate a synthetic ripple signal based on the output voltage and on the duty cycle of the converter. However the feedback network could comprise also active components as well. The synthetic ripple signal is then compared to a reference voltage to modulate the duty cycle of the converter in order to regulate the power converter's output voltage independently from the load, the input and output voltage variations.

By injecting the disturbance signal of adequate amplitude into an appropriate node of the feedback network, the loop is affected to the point that it tends to lock to the injected signal's frequency even though the phase may be different. If, for instance, the impedance of the injection node is relatively high, the injected signal may "kick" the voltage of the node and wait that it relaxes back thus forcing to operate in synchronism with the disturbance signal. This mechanism of locking may take a few periods or it may occur very quickly.

However the free running frequency of the converter (before any signal injection) has to be relatively close to the desired switching frequency. If the two frequencies are far apart, the power converter may start switching at sub-harmonics of the desired frequency (frequency beating phenomenon). In some cases, what appears to be a sporadic phase error, when looked more closely over a certain number of periods, it reveals to be a lower frequency periodic beating.

As previously mentioned, the duty cycle of the periodic disturbance signal has to have minimum duty cycle to allow the power converter to determine its own duty cycle and regulate the output at the desired voltage. A typical duty cycle of the disturbance signal is between 3 to 5%. When and if the disturbance signal is introduced abruptly, the perturbation may cause a transient during which the duty cycle is temporarily varied until the locking occurs. This transient may cause significant over-voltages or under-voltages of the regulated voltage and should be either smoothed out or anyway controlled.

For this reason the amplitude of the disturbance signal plays a very important role. If the amplitude is not large enough the synchronization may not occur or it may cause sub-harmonic switching, however if it is too large the temporary duty cycle perturbation may be unacceptable. Two separate solutions are proposed in the present invention to alleviate this problem.

The first proposed solution is to adjust the free running frequency to be close enough to the desired frequency so as to reduce the likelihood of sub-harmonics locking and to eliminate the need for large amplitude disturbance signals. This adjustment can be performed by adding hysteresis to the reference voltage. This is relatively easy to implement and very effective in approaching the free running frequency into the locking range of the disturbance signal. When the drive signal changes polarity a switch may increase or decrease the reference voltage of the right amount to generate the hysteresis of the proper value.

The second solution is to add a phase detector with a filter and a constant leakage in order to maintain the amplitude of the disturbance signal at the minimum value needed to perform the synchronization. The switching frequency is compared digitally to the desired frequency of the disturbance signal and the digital error is filtered. Substantially this circuit would act similarly to a rudimentary PLL used exclusively to adjust the amplitude of the disturbance signal.

A possible and somewhat similar alternative could be to monitor the output voltage and, in real time, modulate the amplitude of the disturbance signal so as to minimize the output voltage variations during the transient. Another less simple solution could be to sweep the disturbance signal frequency so as to gradually reach the desired frequency to prevent abrupt variations of the power converter's duty cycle.

Depending on the impedance of the injection node, the power converter may be synchronized to be switching at frequencies lower or higher than the free running frequency. As previously mentioned if the impedance of the injection node is relatively high, the signal may kick the internal voltages and force the relaxation of the node's voltage so as to lock the switching frequency to be lower than the free running frequency.

However if the impedance of the injection node is relatively low, the amplitude of the disturbance signal needs to be high enough to provoke the perturbation. In that case and, if the free running period of the loop is larger than its overall delay, the internal voltage generally recovers very quickly from the disturbance. If the caused perturbation is large enough to trigger a' toggle of the hysteretic comparator, a switching of the output stage is obtained and this may quickly synchronize the power converter to the desired frequency even if higher than its free running frequency.

The disturbance signal could be introduced in many nodes of the hysteretic loop including in appropriate nodes of the comparator 2 of FIG. 1, however the injection of the signal in the feedback network 6 appears to be quite convenient not to alter the DC regulation point of the output voltage. Furthermore typically high and low impedance nodes are present in the feedback network giving flexibility to the types and amplitudes of injected signals and to the desired frequency to be synchronized.

FIG. 2 shows a general implementation of the present invention where the oscillator 5 generates a clock signal at the desired frequency that is fed to the block 7. The block 7 generates the synchronization signal operating at the same frequency of the clock generated by the oscillator 5 with very small duty cycle. The synchronization signal 8 is fed into a node of the feedback network 6.

This is an open loop approach with respect operation of the prior art, as depicted in FIG. 1 where the PLL circuit constantly monitors the switching frequency. Therefore the operations of the power converter may appear to be less controlled; however it does not present all the possible disadvantages of feedback control circuits, like the inherent slow locking speed, the need for frequency compensation networks, and the possible instability of the circuit or poor phase margin.

The general approach depicted in FIG. 2 may be implemented with a current source switched at the desired frequency so that the signal injected is a pure current signal. This is implemented in integrated circuits with switched current mirrors in their various versions. However a current signal may be also more easily implemented as shown in FIG. 3 where the MOS switch M3 is toggled directly by the oscillator output clock signal. The resistor R1 limits the current injected in the feedback network 6 and adjusts the amplitude of the synchronization disturbance signal.

The possible disadvantage of using a transistor as depicted in FIG. 3 is that if the clock signal edges are very fast, the drain gate parasitic capacitance associated with the transistor M3 may inject very fast high amplitude currents in correspondence of the clock edges. It should be noted that the resistor R1 could also be coupled to the source of M3 with similar effects of limiting the current.

A further embodiment of the present invention is illustrated in FIG. 4, where the resistor R1 of FIG. 3 has been replaced with a capacitor C2. Depending on the impedance of the node where the synchronization signal is injected a capacitor in series to the drain of the switch M3 may be more effective in properly affecting the circuit behavior and in locking to the desired frequency. Similarly combinations of several passive components or more sophisticated networks may be utilized in place of the capacitor C2, depending on the injection nodes' impedance, and in general on the overall conditions of the power converter.

In order to control the amplitude of the disturbance signal an adaptive amplitude control block may be utilized to modulate the synchronization signal intensity. FIG. 5 depicts the block 9 that drives the transistor M4 to vary the resistivity of the current path in series to the drain of M3. The adaptive amplitude control may be implemented in various ways, as previously explained. This embodiment, if properly implemented, may prevent an abrupt change in the duty cycle of the power converter with consequent over or under voltage occurrences of the regulated output.

FIG. 6 shows an embodiment of the feedback network 6 for a buck converter. This is an example but it may be implemented in many other ways without affecting the final result of the present invention. In FIG. 6 R6 and R7 scale the output voltage down to the desired DC value. The capacitor C5 is a feed-forward capacitor. The other passive components generate the synthetic ripple signal that is compared to the reference voltage. The node C is fed to the comparator and the voltage at this node constitutes the synthetic ripple signal. The nodes A or B are the ones used to inject the disturbance signal.

In the specific case, if the synchronization signal is injected at the node A, and assuming that the amplitude of the signal is large enough, the switching frequency of the converter can be synchronized to be lower than the free running frequency, since the node A has relatively high impedance. If the synchronization signal is injected at the node B, and assuming that the amplitude of the signal be large enough, the switching frequency of the converter can be synchronized to be higher than the free running frequency, since the node B has relatively low impedance. In this second case the period of the free running converter has to be larger than the overall delay of the hysteretic loop in order to allow a faster switching.

In the case of injection at the node A, it is expected that the injection cause a perturbation that slowly recovers by the relaxation mechanism of the voltage back to its previous value. In fact when a disturbance signal is injected in node A, the large RC time constant, composed mainly of R3 and C3 in parallel to R2, prevents a fast recovery of the signal.

In the case of injection at the node B, it is expected that the injection cause a perturbation that recovers very quickly but such that its amplitude be large enough to cause a toggle of the comparator and therefore of the output stage of the power converter. When the signal is injected at the node B, the capacitor C3 is in parallel to the series of R2 and R3, therefore the equivalent impedance is roughly C3 and the signal tends to slew back to its original value quite quickly favoring the synchronization to frequencies faster than the free running frequency.

FIG. 7 depicts a hysteretic boost power converter. The feedback network 13 is clearly quite different than the feedback network used for a buck converter but the main principle remains, in fact a synthetic ripple signal generated by the block 13 is fed to the comparator 11. It has been demonstrated that a similar approach, to inject a periodic disturbance signal generated by the block 14, can synchronize the power converter to switch at a desired frequency. In the case of the boost converter, due to the intrinsic nature of the feedback network utilized, it appears much simpler to synchronize to frequencies higher than the free running frequency because the impedance of the nodes involved is generally lower than it is for a buck converter. However the synchronization to lower frequencies is also possible.

FIG. 8 shows the waveforms of the switching drive node 16 and the disturbance signal 15 for the buck power converter of FIG. 3, with the feedback network of FIG. 6, when the synchronization signal is injected in node B. As it can be noted the free running switching frequency is of 50 MHz before any periodic disturbance signal is injected, and as soon as the disturbance signal is introduced, the power converter drive signal locks very quickly to the desired frequency of 60 MHz of the synchronization signal. It can also be seen that the locking time is extremely short (about 50 ns).

FIG. 9, very similarly, shows the waveforms of the switching drive node 18 and the disturbance signal 17 for the buck power converter of FIG. 3, with the feedback network of FIG. 6, when the synchronization signal is injected in node A. In this case the values of the components of the feedback network of FIG. 6 are slightly different in order to obtain a lower free running frequency. As it can be noted the free running switching frequency is of about 32 MHz, and as soon as the disturbance signal is introduced, the power converter drive signal locks very quickly to the desired frequency of 20 MHz of the synchronization signal. It can also be seen that the locking time is extremely short (a few switching periods).

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 2

Figure 2:
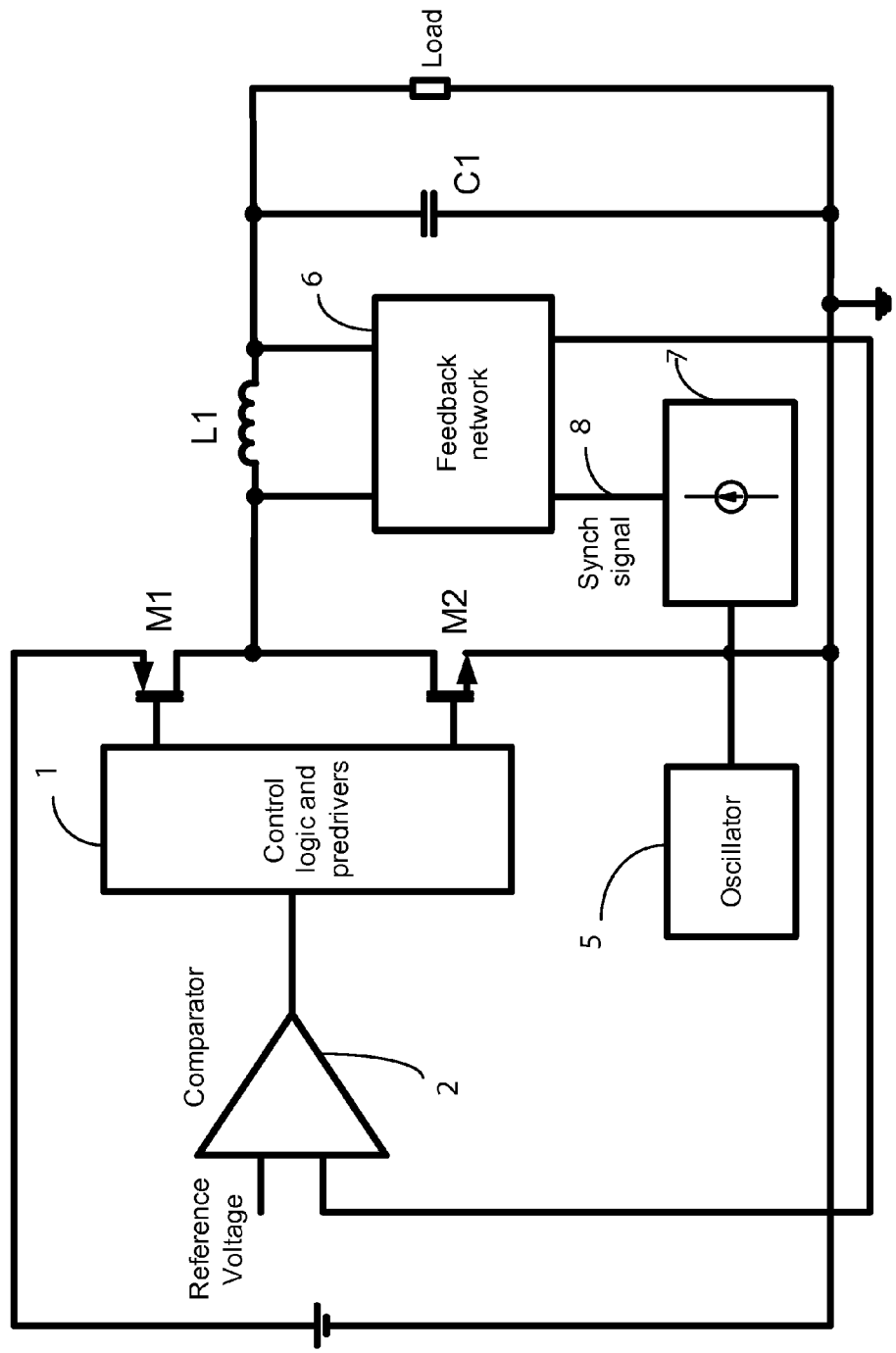
FIG. 2 shows a schematic of the buck hysteretic switching power converter with disturbance signal injection according to a first embodiment of the present invention.

FIG. 2 shows a general implementation of the present invention where the oscillator 5 generates a clock signal at the desired frequency that is fed to the block 7. The block 7 generates the synchronization signal operating at the same frequency of the clock generated by the oscillator 5 with very small duty cycle. The synchronization signal 8 is fed into a node of the feedback network 6.

The disturbance signal could be introduced in many nodes of the hysteretic loop including in appropriate nodes of the comparator 2 of FIG. 2, however the injection of the signal in the feedback network 6 appears to be quite convenient not to alter the DC regulation point of the output voltage. Furthermore typically high and low impedance nodes are present in the feedback network giving flexibility to the types and amplitudes of injected signals and to the desired frequency to be synchronized.

Figure 1:
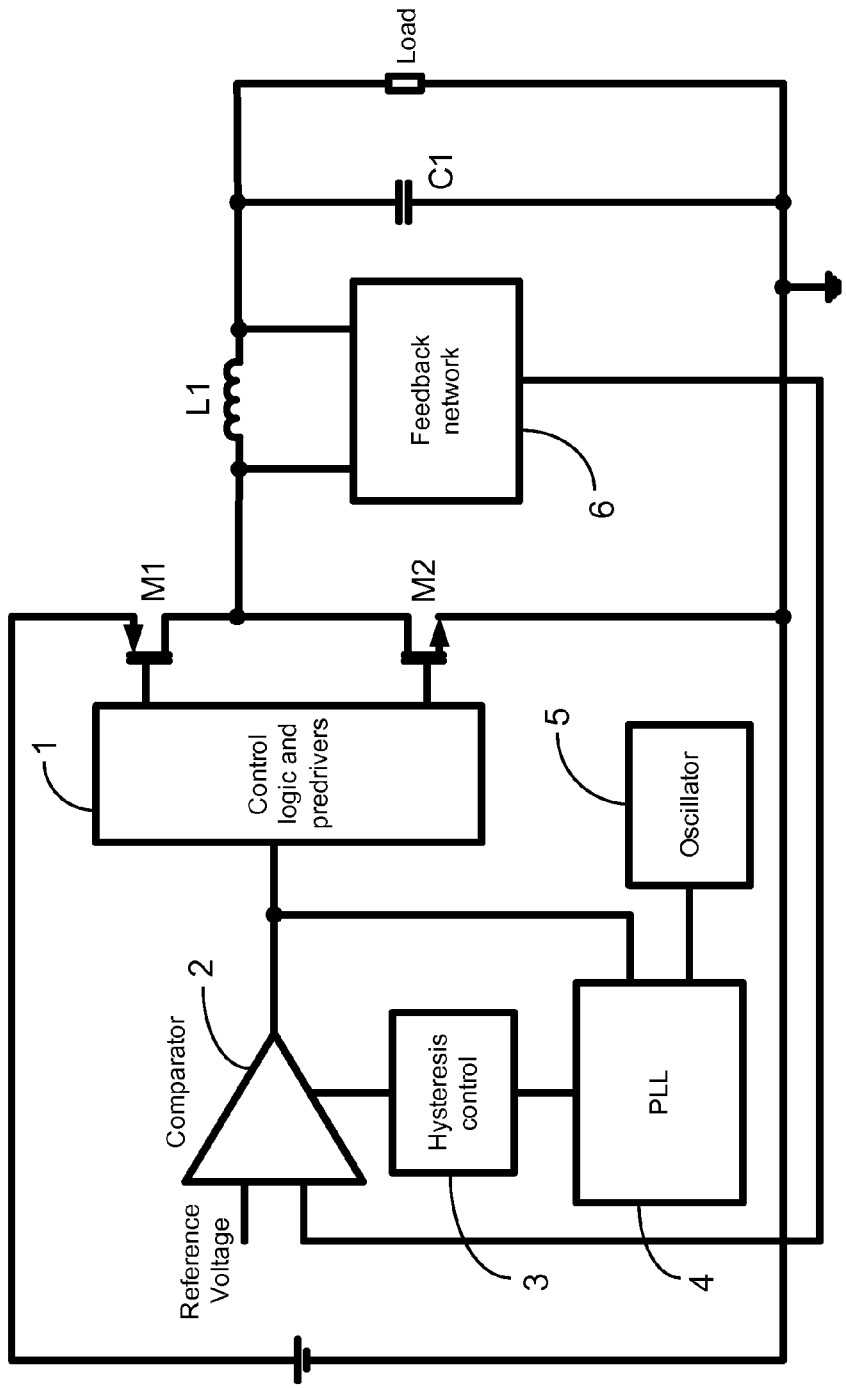
FIG. 1 shows a general hysteretic buck power converter topology with conventional switching frequency control circuit (prior art).

This is an open loop approach with respect operation of the prior art, as depicted in FIG. 1 where the PLL circuit constantly monitors the switching frequency. Therefore the operations of the power converter may appear to be less controlled; however it does not present all the possible disadvantages of feedback control circuits, like the inherent slow locking speed, the need for frequency compensation networks, and the possible instability of the circuit or poor phase margin.

The general approach depicted in FIG. 2 may be implemented with a current source switched at the desired frequency so that the signal injected is a pure current signal. This is implemented in integrated circuits with switched current mirrors in their various versions.

B FIG. 3

Figure 3:
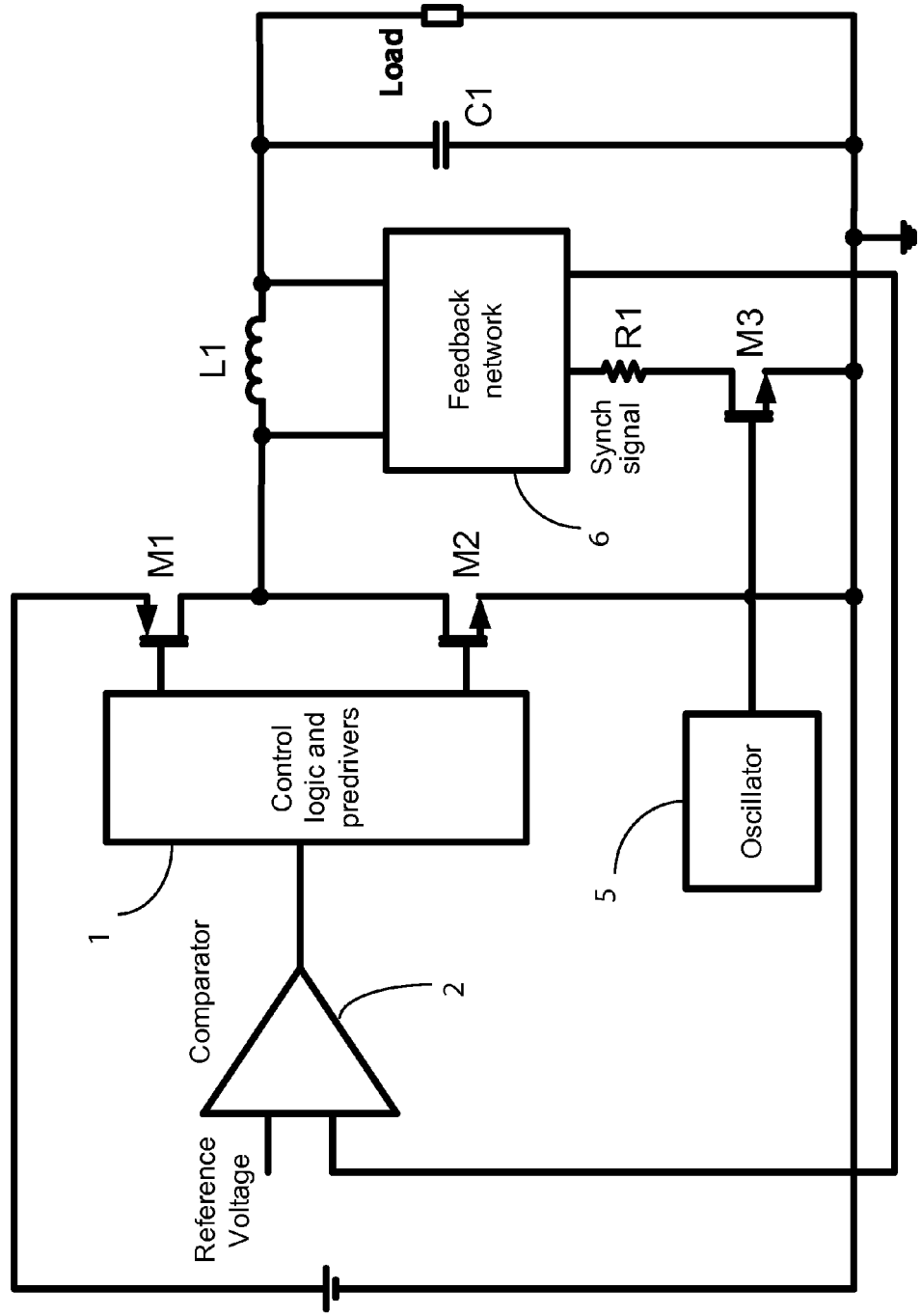
FIG. 3 shows a schematic of the buck hysteretic switching power converter according to the preferred embodiment of the present invention.

However, a current signal may be also more easily implemented as in FIG. 3 where the MOS switch M3 is toggled directly by the oscillator output clock signal. The resistor R1 limits the current injected in the feedback network 6 and adjusts the amplitude of the synchronization disturbance signal.

The possible disadvantage of using a transistor as in FIG. 3 is that if the clock signal edges are very fast, the drain gate parasitic capacitance associated with the transistor M3 may inject very fast high amplitude currents in correspondence of the clock edges. It should be noted that the resistor R1 could also be coupled to the source of M3 with similar effects of limiting the current.

C FIG. 4

Figure 4:
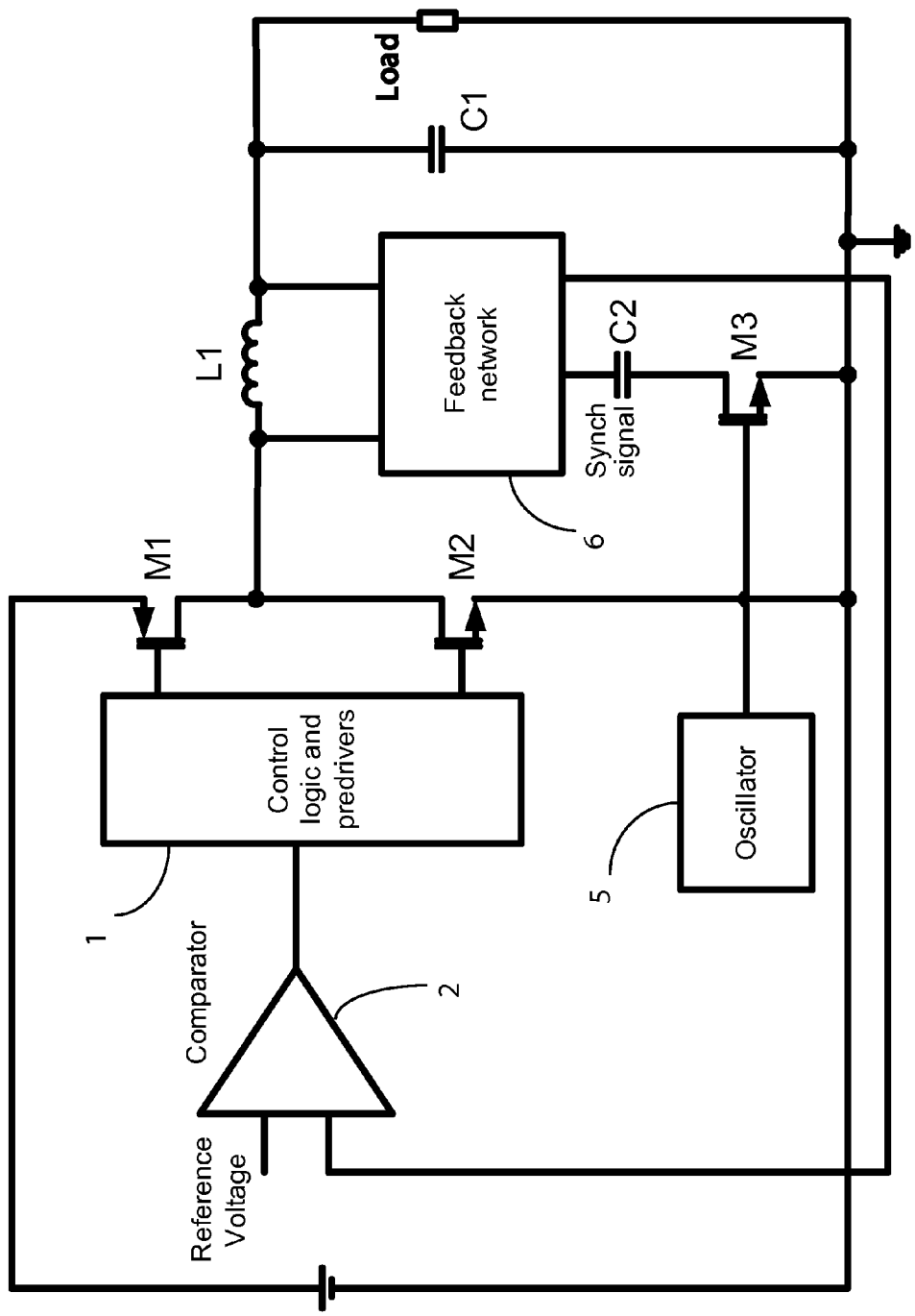
FIG. 4 shows a schematic of the buck hysteretic power converter according to a further embodiment of the present invention.

A further embodiment of the present invention is illustrated in FIG. 4, where the resistor R1 of FIG. 3 has been replaced with a capacitor C2. Depending on the impedance of the node where the synchronization signal is injected a capacitor in series to the drain of the switch M3 may be more effective in properly affecting the circuit behavior and in locking to the desired frequency. Similarly combinations of several passive components or more sophisticated networks may be utilized in place of the capacitor C2, depending on the injection nodes' impedance, and in general on the overall conditions of the power converter.

D FIG. 5

Figure 5:
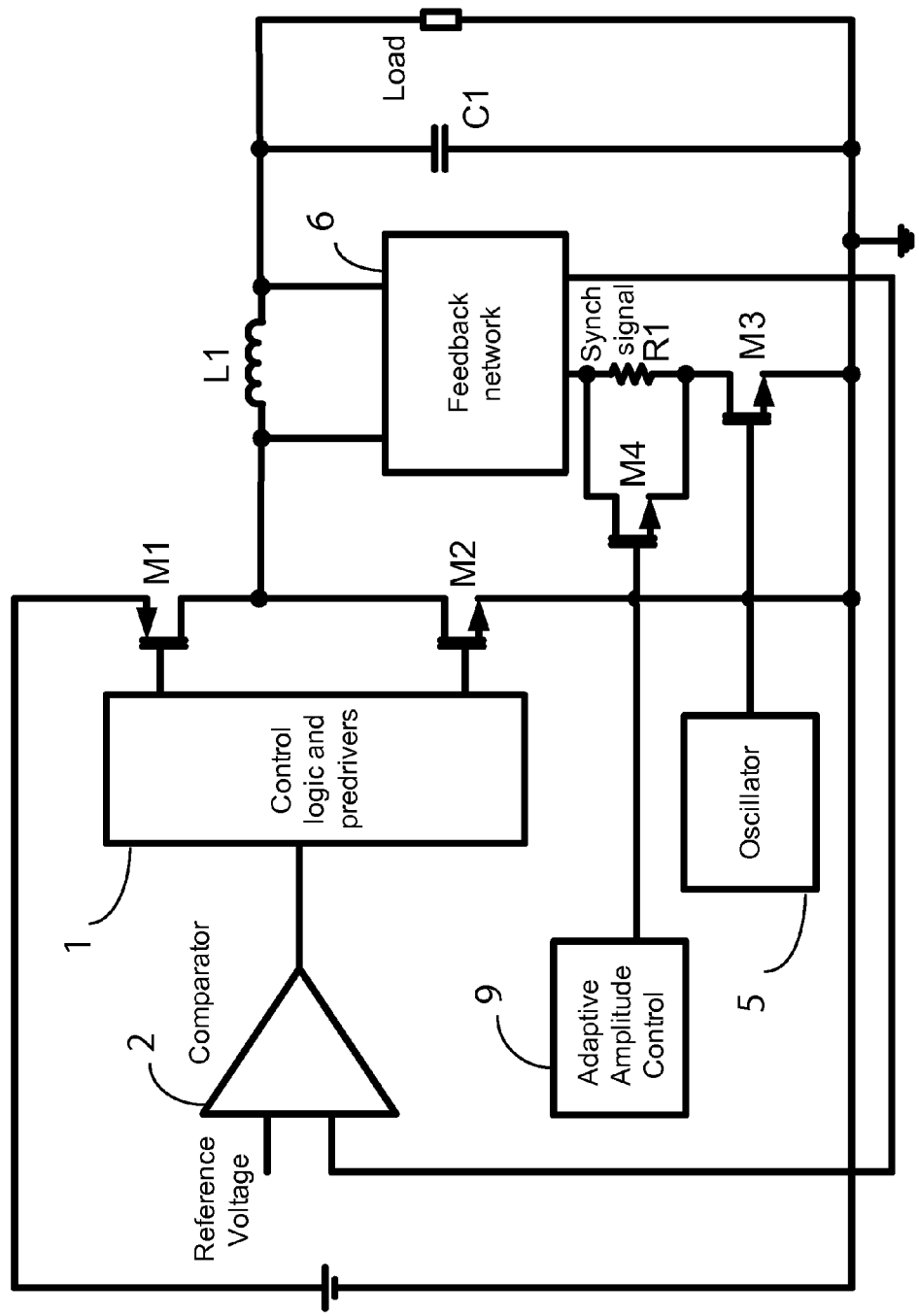
FIG. 5 shows a schematic of the buck hysteretic power converter that includes an adaptive amplitude control circuit according to another embodiment of the present invention.

In order to control the amplitude of the disturbance signal an adaptive amplitude control block may be utilized to modulate the synchronization signal intensity. FIG. 5 depicts the block 9 that drives the transistor M4 to vary the resistivity of the current path in series to the drain of M3. The adaptive amplitude control may be implemented in various ways, as previously explained. This embodiment, if properly implemented, may prevent an abrupt change in the duty cycle of the power converter with consequent over or under voltage occurrences of the regulated output.

E FIG. 6

Figure 6:
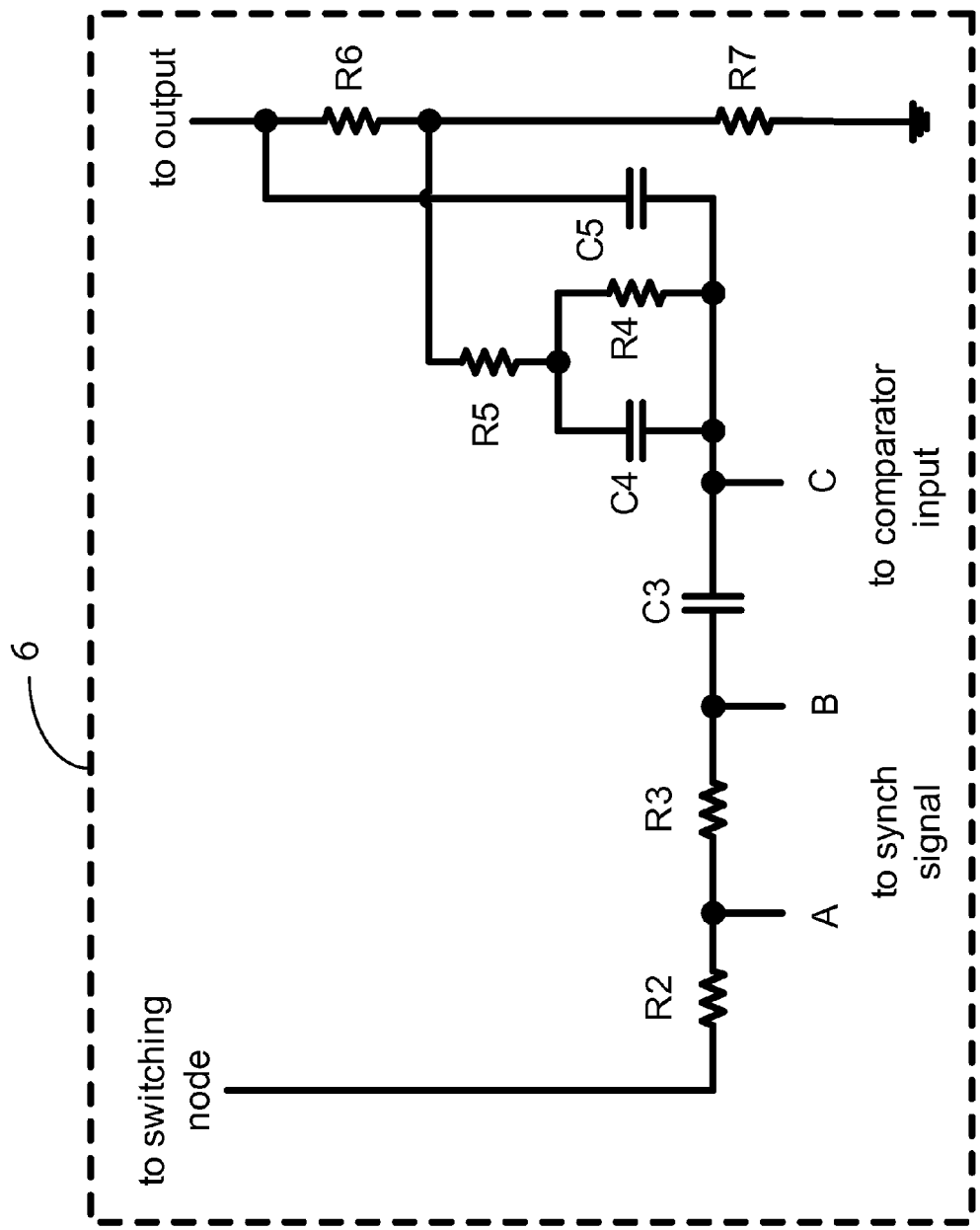
FIG. 6 shows a schematic of the feedback network used in a buck converter with injection nodes according to one embodiment of the present invention.

FIG. 6 shows an embodiment of the feedback network 6 for a buck converter. This is an example but it may be implemented in many other ways without affecting the final result of the present invention. In FIG. 6 R6 and R7 scale the output voltage down to the desired DC value. The capacitor C5 is a feed-forward capacitor. The other passive components generate the synthetic ripple signal that is compared to the reference voltage. The node C is fed to the comparator and the voltage at this node constitutes the synthetic ripple signal. The nodes A or B are the ones used to inject the disturbance signal.

In the specific case, if the synchronization signal is injected at the node A, and assuming that the amplitude of the signal is large enough, the switching frequency of the converter can be synchronized to be lower than the free running frequency, since the node A has relatively high impedance. If the synchronization signal is injected at the node B, and assuming that the amplitude of the signal be large enough, the switching frequency of the converter can be synchronized to be higher than the free running frequency, since the node B has relatively low impedance. In this second case the period of the free running converter has to be larger than the overall delay of the hysteretic loop in order to allow a faster switching.

In the case of injection at the node A, it is expected that the injection cause a perturbation that slowly recovers by the relaxation mechanism of the voltage back to its previous value. In fact when a disturbance signal is injected in node A, the large RC time constant, composed mainly of R3 and C3 in parallel to R2, prevents a fast recovery of the signal.

In the case of injection at the node B, it is expected that the injection cause a perturbation that recovers very quickly but such that its amplitude be large enough to cause a toggle of the comparator and therefore of the output stage of the power converter. When the signal is injected at the node B, the capacitor C3 is in parallel to the series of R2 and R3, therefore the equivalent impedance is roughly C3 and the signal tends to slew back to its original value quite quickly favoring the synchronization to frequencies faster than the free running frequency.

F FIG. 7

Figure 7:
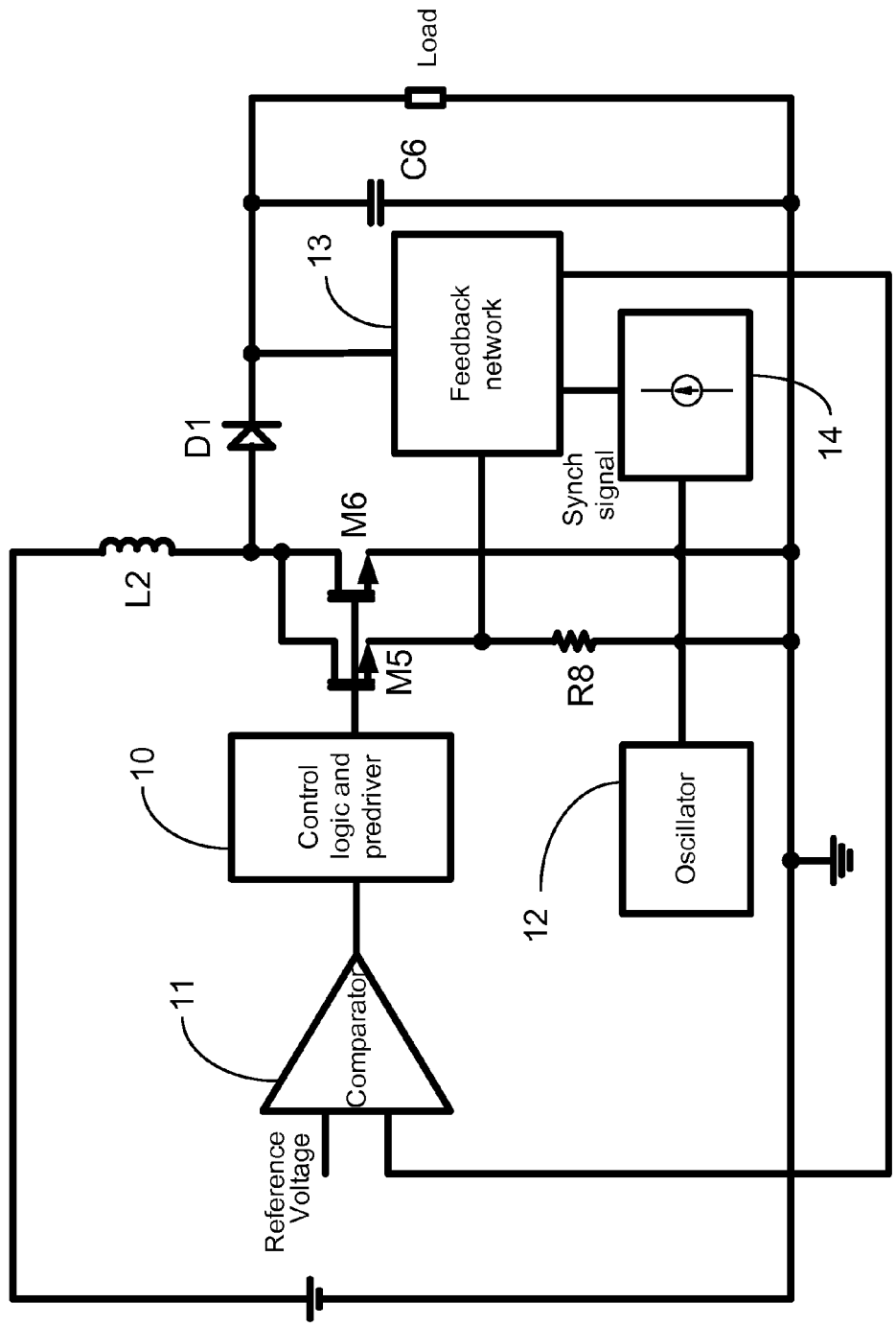
FIG. 7 shows a schematic of a boost hysteretic switching power converter with disturbance signal injection according to a further embodiment of the present invention.

FIG. 7 depicts a hysteretic boost power converter. The feedback network 13 is clearly quite different than the feedback network used for a buck converter but the main principle remains, in fact a synthetic ripple signal generated by the block 13 is fed to the comparator 11. It has been demonstrated that a similar approach, to inject a periodic disturbance signal generated by the block 14, can synchronize the power converter to switch at a desired frequency. In the case of the boost converter, due to the intrinsic nature of the feedback network utilized, it appears much simpler to synchronize to frequencies higher than the free running frequency because the impedance of the nodes involved is generally lower than it is for a buck converter. However the synchronization to lower frequencies is also possible.

G FIG. 8

Figure 8:
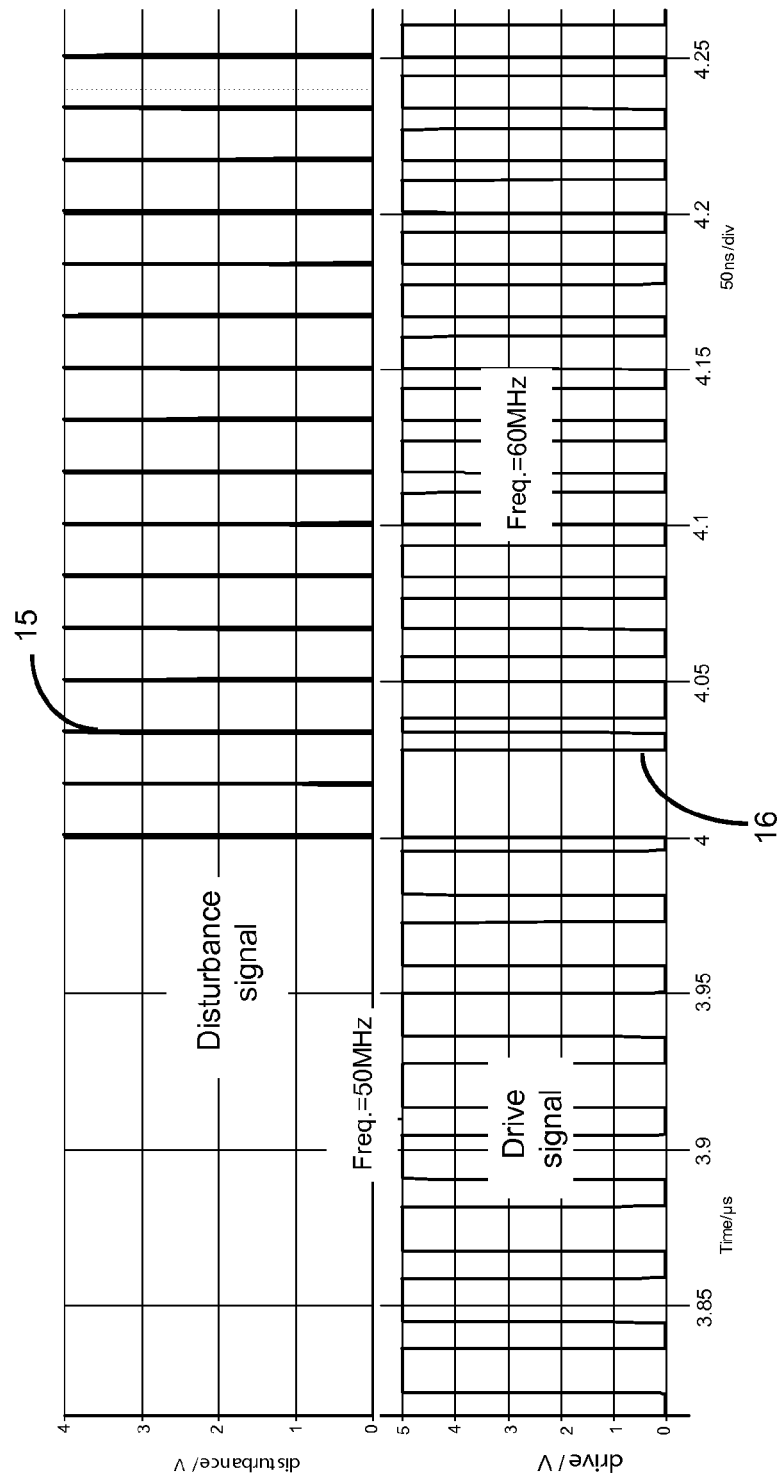
FIG. 8 shows the drive voltage and the disturbance drive signal waveforms as result of the simulation of the circuit of FIG. 3 where the injection is occurring in node B of FIG. 6.

FIG. 8 shows the waveforms of the switching drive node 16 and the disturbance signal 15 for the buck power converter of FIG. 3, with the feedback network of FIG. 6, when the synchronization signal is injected in node B. As it can be noted the free running switching frequency is of 50 MHz before any periodic disturbance signal is injected, and as soon as the disturbance signal is introduced, the power converter drive signal locks very quickly to the desired frequency of 60 MHz of the synchronization signal. It can also be seen that the locking time is extremely short (about 50 ns).

H FIG. 9

Figure 9:
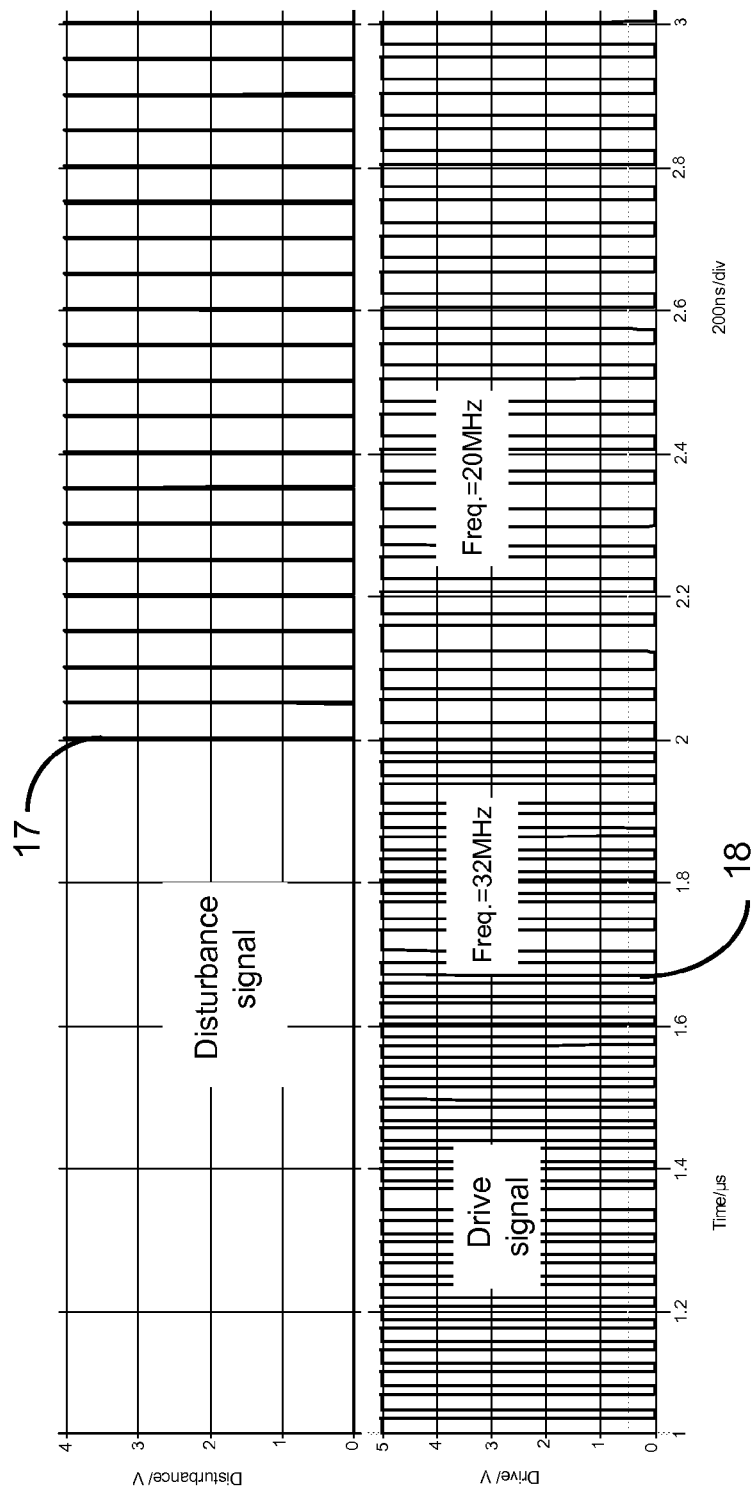
FIG. 9 shows the drive voltage and the disturbance drive signal waveforms as result of the simulation of the circuit of FIG. 3 where the injection is occurring in node A of FIG. 6.
Figure 10:
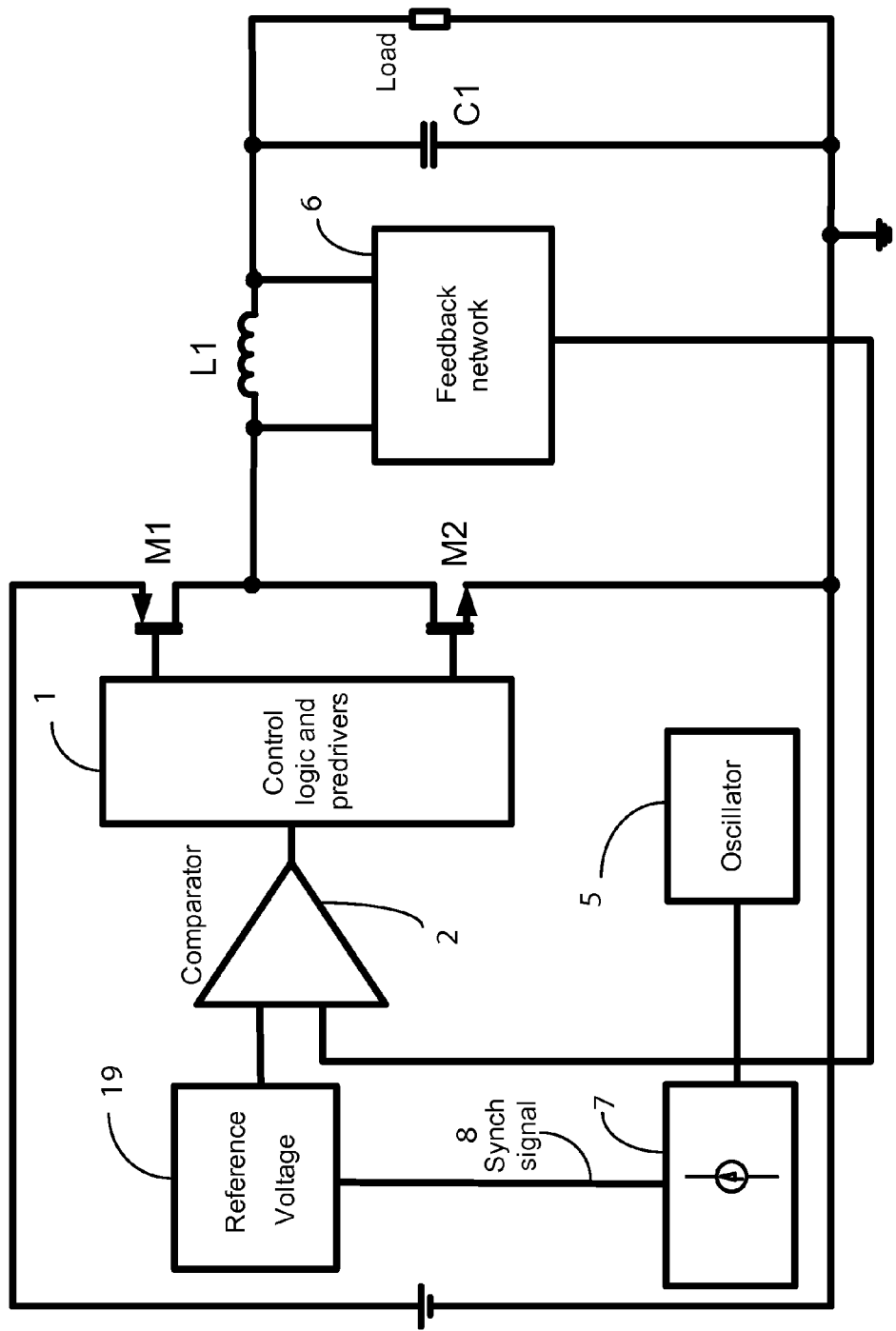
FIG. 10 shows a schematic of the buck hysteretic switching power converter with disturbance signal injection into a reference voltage according to a further embodiment of the present invention.

FIG. 9, very similarly, shows the waveforms of the switching drive node 18 and the disturbance signal 17 for the buck power converter of FIG. 3, with the feedback network of FIG. 6, when the synchronization signal is injected in node A. In this case the values of the components of the feedback network of FIG. 6 are slightly different in order to obtain a lower free running frequency. As it can be noted the free running switching frequency is of about 32 MHz, and as soon as the disturbance signal is introduced, the power converter drive signal locks very quickly to the desired frequency of 20 MHz of the synchronization signal. It can also be seen that the locking time is extremely short (a few switching periods).

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A hysteretic power converter,
wherein the switching frequency of said hysteretic power converter is synchronized to a desired frequency,
wherein synchronization is obtained with an open loop system, by means of injection of a disturbance signal into a feedback network of said hysteretic power converter, and
wherein said disturbance signal is a periodic signal operating at said desired frequency.

2. The hysteretic power converter of claim 1, wherein said hysteretic power converter is a hysteretic boost power converter.

3. The hysteretic power converter of claim 1, wherein said disturbance signal is a current signal.

4. The hysteretic power converter of claim 1, wherein said disturbance signal is generated by a switch in series to at least one passive component;
wherein said switch is driven by a signal operating at said desired frequency;
wherein said switch is coupled to a positive or a negative terminal of a power source, and to said at least one passive component, and
wherein said at least one passive component is coupled to a node of said feedback network of said hysteretic power converter.

5. The hysteretic power converter of claim 1, wherein said disturbance signal is generated by a current source operated at said desired frequency.

6. The hysteretic power converter of claim 1, wherein said desired frequency is independent from a free running switching frequency of said hysteretic power converter.

7. The hysteretic power converter of claim 1, wherein an amplitude of said disturbance signal is adaptively varied depending on operating conditions of said hysteretic power converter in order to reach an adequate level required to synchronize said hysteretic power converter with minimum adverse effects.

8. The hysteretic power converter of claim 1, wherein a free running frequency of said hysteretic power converter is adjusted to be in locking range of said disturbance signal.

9. The hysteretic power converter of claim 1, wherein said synchronization to said desired frequency occurs only in Continuous Conduction Mode.

10. A method to synchronize the switching frequency of a hysteretic power converter to a desired frequency comprising:
generating a clock signal operating at said desired frequency;
generating a periodic signal operating at said desired frequency with very small duty cycle;
generating a disturbance signal with substantially equivalent period and duty cycle of said periodic signal, and
injecting said disturbance signal into a feedback network of said hysteretic power converter,
whereby synchronization between said desired frequency of said clock signal and said switching frequency of said hysteretic power converter is obtained with an open loop system.

11. The method of claim 10 wherein said hysteretic power converter is a hysteretic boost power converter.

12. The method of claim 10, wherein said disturbance signal is a current signal.

13. The method of claim 10, wherein said disturbance signal is generated by a switch in series to at least one passive component;
wherein said switch is driven by said periodic signal operating at said desired frequency;
wherein said switch is coupled to a positive or a negative terminal of a power source, and to said at least one passive component, and
wherein said at least one passive component is coupled to a node of said feedback network of said hysteretic power converter.

14. The method of claim 10, wherein said disturbance signal is generated by a current source operated at said desired frequency.

15. The method of claim 10, wherein said desired frequency is independent from a free running switching frequency of said hysteretic power converter.

16. The method of claim 10, wherein an amplitude of said disturbance signal is adaptively varied depending on operating conditions of said hysteretic power converter in order to reach an adequate level required to synchronize said hysteretic power converter with minimum adverse effects.

17. The method of claim 10, wherein a free running frequency of said hysteretic power converter is adjusted to be in locking range of said disturbance signal.

18. The method of claim 10, wherein said synchronization to said desired frequency occurs only in Continuous Conduction Mode.

19. A hysteretic power converter,
wherein the switching frequency of said hysteretic power converter is synchronized to a desired frequency by means of injection of a disturbance signal into a hysteretic comparator of said hysteretic power converter,
wherein synchronization is obtained with an open loop system, and
wherein said disturbance signal is a periodic signal operating at said desired frequency.

20. A hysteretic power converter,
wherein the switching frequency of said hysteretic power converter is synchronized to a desired frequency by means of injection of a disturbance signal into a voltage reference of said hysteretic power converter,
wherein synchronization is obtained with an open loop system, and
wherein said disturbance signal is a periodic signal operating at said desired frequency.

21. The hysteretic power converter of claim 1, wherein said hysteretic power converter is a hysteretic buck power converter.

22. The method of claim 10 wherein said hysteretic power converter is a hysteretic buck power converter.

* * * * *